US012562474B2

(12) United States Patent
Wyler

(10) Patent No.: US 12,562,474 B2
(45) **Date of Patent: *Feb. 24, 2026**

(54) SYSTEM AND METHOD FOR REAL-TIME MULTIPLEXING PHASED ARRAY ANTENNAS TO MODEMS

(71) Applicant: WAFER LLC, Hanover, NH (US)

(72) Inventor: Greg Wyler, Stuart, FL (US)

(73) Assignee: Wafer LLC, Hanover, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,204

(22) Filed: May 2, 2024

(65) Prior Publication Data

US 2025/0007158 A1 Jan. 2, 2025

Related U.S. Application Data

(60) Continuation of application No. 18/109,224, filed on Feb. 13, 2023, now Pat. No. 11,984,664, which is a (Continued)

(51) Int. Cl.
*H01Q 3/36* (2006.01)
*H04B 7/0456* (2017.01)
(Continued)

(52) U.S. Cl.
CPC ............ *H01Q 3/36* (2013.01); *H04B 7/0486* (2013.01); *H04B 7/0817* (2013.01); (Continued)

(58) Field of Classification Search
CPC ...... H01Q 3/36; H01Q 3/2605; H01Q 3/2694; H01Q 21/28
See application file for complete search history.

(56) References Cited

U.S. PATENT DOCUMENTS 345,599 A 7/1886 Paulraj
5,345,599 A 9/1994 Paulraj
(Continued)

FOREIGN PATENT DOCUMENTS

CN 101454941 B 6/2009
CN 104467938 A 3/2015
(Continued)

OTHER PUBLICATIONS

Pauluzzi, et al., A comparison of SNR estimation techniques for the AWGN channel, IEEE Transactions on communications, Aug. 6, 2002, pp. 1681-1691, 48(10).
(Continued)

*Primary Examiner* — Awat M Salih

(57) ABSTRACT

A system having a platform upon which several phased antenna arrays are mounted and which can communicate with satellites. The system includes a switch that can connect any of the phased array antennas to any of available modems. The system further includes a router that can connect any of the modems to any available computing devices. Based on parameters such as data rates, signal strength, and account information, one or more communication paths are selected for a computing device requesting to communicate with a satellite. Each communication path is established by operating the switch to connect a selected antenna to a selected modem, and operating the router to transfer data between the computing device and the selected modem.

18 Claims, 10 Drawing Sheets

Related U.S. Application Data division of application No. 16/928,126, filed on Jul. 14, 2020, now Pat. No. 11,715,876.

(60) Provisional application No. 62/874,447, filed on Jul. 15, 2019.

(51) Int. Cl.
*H04B 7/08* (2006.01)
*H04B 7/185* (2006.01)

(52) U.S. Cl.
CPC ......... *H04B 7/0854* (2013.01); *H04B 7/0857* (2013.01); *H04B 7/18515* (2013.01)

(56) References Cited

U.S. PATENT DOCUMENTS

| | | | |
|---|---|---|---|
| 5,463,656 | A | 10/1995 | Polivka |
| 6,362,906 | B1 | 3/2002 | O'Shea |
| 7,466,269 | B2 | 12/2008 | Haziza |
| 7,884,766 | B2 | 2/2011 | Haziza |
| 7,982,664 | B1 * | 7/2011 | Uscinowicz .......... G01S 7/4004 342/174 |
| 9,070,974 | B2 | 6/2015 | Hu |
| 9,252,868 | B1 * | 2/2016 | Bull .................. H04B 7/18519 |
| 10,177,453 | B2 | 1/2019 | Haziza |
| 10,574,337 | B1 * | 2/2020 | Chari ................ H04B 7/18526 |
| 10,594,383 | B1 * | 3/2020 | Orhan ...................... H04B 7/08 |
| 11,677,145 | B1 * | 6/2023 | Sharma ................ H01Q 3/2682 342/372 |
| 11,715,876 | B2 | 8/2023 | Wyler |
| 11,984,664 | B2 | 5/2024 | Wyler |
| 2002/0058477 | A1 | 5/2002 | Chapelle |
| 2003/0040880 | A1 | 2/2003 | Bortnyk |
| 2006/0178143 | A1 | 8/2006 | Chang |
| 2008/0036664 | A1 | 2/2008 | Haziza |
| 2009/0091500 | A1 | 4/2009 | Haziza |
| 2011/0249779 | A1 | 10/2011 | Miao |
| 2013/0307727 | A1 | 11/2013 | He |
| 2016/0254889 | A1 | 9/2016 | Shattil |
| 2017/0093363 | A1 * | 3/2017 | Tabatabai ................. H03H 7/20 |
| 2017/0155443 | A1 | 6/2017 | Haziza |
| 2018/0019806 | A1 | 1/2018 | Buer |
| 2018/0020440 | A1 * | 1/2018 | Stuck .................. H04W 28/065 |
| 2018/0062272 | A1 | 3/2018 | Haziza |
| 2018/0159213 | A1 | 6/2018 | Haziza |
| 2018/0241122 | A1 * | 8/2018 | Jalali Mazlouman ... H01Q 3/34 |
| 2018/0375570 | A1 | 12/2018 | Lofquist |
| 2020/0112102 | A1 | 4/2020 | Haziza |
| 2022/0200648 | A1 * | 6/2022 | Das ........................ H01Q 1/245 |

FOREIGN PATENT DOCUMENTS

| | | | |
|---|---|---|---|
| CN | 109964364 | A | 7/2019 |
| JP | 2002521955 | A | 7/2002 |
| JP | 2004510392 | A | 4/2004 |
| JP | 2009538565 | A | 11/2009 |
| JP | 2015525504 | A | 9/2015 |
| WO | 2007065143 | A2 | 6/2007 |
| WO | 201801787 | A1 | 1/2018 |

OTHER PUBLICATIONS

Akbari, et al., Receiver diversity combining using evolutionary algorithms in rayleigh fading channel, The Scientific World Journal, 2014, 11 pages.
First Office Action for Chinese Patent Application No. 202010682261, Oct. 30, 2023, 10 pages.
First Office Action for Chinese Patent Application No. 202010683057, Oct. 31, 2023, 29 pages.
Second Office Action for Chinese Patent Application No. 202010683057, Mar. 29, 2024, 29 pages.
European Search Report for EP 20185887, Nov. 13, 2020, 33 pages.
European Search Report for EP 20185942, Nov. 18, 2020, 14 pages.
European Search Report for EP 20185942, Mar. 3, 2023, 5 pages.
Reasons for Refusal for Japanese Patent Application No. 2020121030, Jun. 4, 2024, 16 pages.
Decision to Grant for Japanese Patent Application No. 2020121030, Feb. 18, 2025, 5 pages.
Reasons for Refusal for Japanese Patent Application No. 2020121031, Jun. 4, 2024, 13 pages.
Written Opinion for Japanese Patent Application No. 2020121031, Sep. 2, 2024, 6 pages.
Decision to Grant a Patent for Japanese Patent Application No. 2020121031, Dec. 23, 2024, 2 pages.
Notice of Allowance for U.S. Appl. No. 16/928,145, filed May 13, 2021, 10 pages.
Notice of Allowance for U.S. Appl. No. 16/928,145, filed Jun. 11, 2021, 7 pages.
Restriction Requirement for U.S. Appl. No. 16/928,126, filed Jul. 13, 2022, 5 pages.
Notice of Allowance for U.S. Appl. No. 16/928,126, filed Oct. 13, 2022, 9 pages.
Notice of Allowance for U.S. Appl. No. 16/928,126, filed Mar. 23, 2023, 9 pages.
Notice of Allowance for U.S. Appl. No. 18/109,224, filed Jan. 2, 2024, 7 pages.

* cited by examiner

Receive signals 540 → Rank signals 545 → Select golden signal 550 → Derive PAPR 555 → Time Synchronize 560 → Phase Calibrate 565 → Apply weights 570 → Sum signals 575

Account data 500 → Satellite data 505 → Motion data 510 → Transmit Request 515 → Determine Path 520 → Verify Strength 525 → Make Connections 530

SYSTEM AND METHOD FOR REAL-TIME MULTIPLEXING PHASED ARRAY ANTENNAS TO MODEMS

RELATED APPLICATIONS

This application is a continuation of co-pending U.S. patent application Ser. No. 18/109,224 filed on Feb. 13, 2023, which is a divisional of U.S. patent application Ser. No. 16/928,126, filed on Jul. 14, 2020, now issued as U.S. Pat. No. 11,715,876, which relates to and claims priority benefit from U.S. Provisional Patent Application No. 62/874,447, filed on Jul. 15, 2019, and these applications are hereby incorporated herein by reference in their entirety.

BACKGROUND

1. Field

This disclosure relates generally to the field of wireless communication, e.g., satellite-based communication and microwave point to point communication, and to the control of multiple phased array antennas communicating with multiple antennas.

2. Related Art

Satellite-based communication is a common way for ships, planes, trains, and people to connect into the global Internet. The method of connection varies from simple connectivity in low frequencies to complex and expensive connectivity in higher frequencies.

The complexity is mostly associated with the antenna. Higher frequencies communication requires utilizing an antenna which points at the satellite. Sometimes the user is moving and the satellite is relatively fixed to earth, but the antenna must maintain pointing to the satellite. There are cases where the satellite is moving and the antenna must still maintain its pointing direction to the satellite. In either case, a self-steering antenna which can maintain its directional steering is an important benefit. The inverse is also true—in many cases the satellite itself needs to steer the beam to a particular point on the earth. Either way there is a transmitter and a receiver, and one of the two, or both of them may need to steer their beams to make their respective connections.

Self-steering antenna systems come in two forms. They are either Mechanically Steered Antenna's (MSA's) which utilize some form of either parabolic dish, array of patches or other planar and 3D antenna designs in conjunction with a motor assembly to steer either directly or through some sort of an amplifying lens towards the receiver, or, alternatively there are Electronically Steered Arrays (ESA's) which use a variety of formats to electronically steer a beam with no moving parts, such as by phase shifting of phased array antennas.

A common way to describe the capabilities of a component like an antenna system is SWaP-C+R, which stands for Size, Weight, Power, Cost and Reliability. These are some of the key determinations of whether an antenna system is fit for a particular purpose. As each of the variables increases, the number of applicable use cases of the antenna is reduced. For instance, a train needs a low profile antenna so that it may go through tunnels, and a plane needs a low profile antenna so as to minimize drag and reduce vortices which impact its flight characteristics. The MSA's have the disadvantage of being physically large in the z-dimension, and also have moving parts subject to wear over time and therefore reduced reliability. The ESA's typically had the disadvantage of consuming significant amounts of power, being heavy because of the heat sinks or other heat dissipation solutions associated with that power, and while physically smaller than an MSA, they have still been quite thick and ultimately expensive. However ESA's typically have a smaller size than an MSA and a higher reliability, thus for certain use cases they have been preferred.

Another important variable in antenna design is aperture size. The aperture size represents the effective collecting surface area of the antenna. This is usually some form of x and y coordinates, representing the surface area presented to the transmitting satellite. The most desired antenna would have a large aperture (x and y) always facing the transmission origin and no z (height/thickness). The larger this aperture size, the higher the gain of the receiving or transmitting signal and therefore the spectral efficiency of the overall system goes up, i.e., for less bandwidth we would get a higher data rate, which translates directly to a significant advantage in the market. Moreover, the higher the gain the less likely the transmitted beam will place its power in unintended directions and cause interference since higher gain equals a narrower beam. Moreover the narrow beam of a higher gain antenna makes it less likely the antenna will receive such unintended interference. From the signal strength perspective, a larger x/y surface area—aperture—is desired, which in turn also reduces the needed power amplifier level for a given link, i.e. less power that needs to be provided to the antenna.

A challenge with the aforementioned technologies is that the large SWaP-C+R has limited the applications for antenna systems. The most efficient beam is the one directly in front of the antenna itself which is called boresight. The boresight is straight above the middle of the antenna i.e. orthogonal to the radiating surface of the antenna. An MSA can turn the entire antenna so it maintains boresight towards a satellite, thereby preserving the aperture size presented to the satellite. Conversely, an ESA tilts the beam electronically, thus presenting a smaller aperture as seen from the satellite, thus degrading its performance by 2 or 4 times depending on the off-angle axis between the receiving and transmitting side. The technical reduction in size follows the $10^{*}\log 10 \cos \theta$ scan loss which directly relates to the seen area i.e. aperture dimension seen from a steered direction. While the MSA will have no scan loss, it requires a large 'swept volume' in order to maintain its pointing direction. This increases both size and weight. In some cases antennas will combine both ESA's and MSA's into a single antenna using an ESA for one direction, perhaps azimuth and a mechanical steering assembly in the elevation direction. These represent a balance in SWaP-C+R for the application.

Another problem with the current antenna systems is that their physical size often limits them to only a single receive and transmit antenna assembly per application. For example, aircraft need steerable antennas in order to maintain a connection with the satellite. However, the SWaP-C limits the number of steerable antennas to a single antenna. Consequently, when the airplane turns by tilting, the connection to the satellite is lost.

In many cases there is also a need for the terminal to connect to multiple satellites at the same time. Moreover, as each satellite may require a particular modem with its particular waveform, there may also be a need to switch the modem/antenna combination as needed.

Accordingly, a need exists in the art for improved satellite communication.

SUMMARY

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments disclosed herein enable multiplexing multiple antennas and modems to enable configuring different modem/antenna combinations, thus generating transmission paths on the fly.

Disclosed embodiments provide an improved control of communication paths among communication devices and satellites. In disclosed embodiments different paths are configured in real time based upon parameters such as the available satellites, the strength of the signal received from each available satellite, the amount and type of data to be transmitted, the cost for transmission in each path, the user account permissions to utilize any of the available paths based on the user's subscription, etc.

Disclosed embodiments enable real time control of communication between a moving platform and a satellite, enabling maintaining communication channels regardless of the movement of the platform, e.g., and airplane or a ship. The platform may have multiple phased array antennas, each having boresight pointing at different direction with respect to the platform (e.g., up, left, right, etc.). As the platform moves, e.g., turns, a controller determines the best antenna(s) to use for the transmission and can select and deselect antennas in real time such that the antenna having the best RSSI (Received Signal Strength Intensity) is always selected.

In disclosed embodiments a lower SWaP-C form of ESA is employed by using multiple ESAs, e.g., using a variable dielectric technology as phase shifters for the ESAs. Utilizing a variable dielectric enables new methods of connectivity for either satellites or ground antenna systems and these new forms of connectivity are particularly beneficial for embodiments disclosed herein.

For security purposes encryption of data is often used, however encryption has limitations in the face of quantum computing. Therefore disclosed embodiments utilize multiple satellites to split data across at least one satellite and multiple other paths and recombine this data in a secure location. Consequently, any interception of an individual path will render only a fraction of the encrypted data file. Thus disclosed aspects provide a more secure file transfer mechanism.

In other cases there is a need to utilize multiple ESA's such that when a platform, such as a train or plane, moves and turns, the most boresight facing ESA will be selected for the highest efficiency. Such a mechanism to automatically switch between ESA's is provided by embodiments disclosed herein.

In still other cases there is rapid transition and blockage of the multiple ESA's, or the aperture size may need to be small and multiple ESA's must be placed in available and potentially at odd angles relative to each other and the distance between the ESA's may be significant. A method of utilizing very low SWaP-C ESA's and dynamically combining the signal strength of multiple of these ESA's and potentially dynamically changing the modems associated with such varying combinations of ESA's is also provided by disclosed embodiments. By dynamically it means that the various connections are managed in real-time, such that at any instance each connection may be replaced or deleted, or a new connection added, as merited by the transmission/reception circumstances.

In still other cases where there are multiple ESA's one may also include a baseband solution to provide some MIMO, nulling or other baseband capabilities, either digital or analog, to improve data rates.

In disclosed embodiments an antenna system for satellite communication is provided, comprising: a plurality of antennas, each antenna comprising a phased array of radiators; a plurality of modems; a switch configured for dynamically coupling any antenna to any of the modems; a plurality of communication devices; a router configured to dynamically couple any of the communication devices to any of the modems; and a controller controlling the switch and the router to provide real time instructions to configured connections of the plurality of antennas, the modems and the communication devices.

In general aspects, a system is mounted onto a mobile platform for communication with satellites, and comprises: a plurality of phased array antennas, each having a plurality of radiators and a plurality of phase shifters, each phase shifter introducing delay to an RF signal propagating therethrough; at least one phase controller operating the phase shifters to introduce the delay to the RF signal; a plurality of modulators/demodulators; a switch operatively connecting any of the modulators/demodulators to any of the phased array antennas as determined in real time; a communication device; a router operatively routing signals between any of the modulators/demodulators and the communication device; and, a control circuit providing real time instructions to the switch to form connections between the modulators/demodulators to any of the phased array antennas and to the router to route signals between the modulators/demodulators and any of the phased array antennas.

In general aspects, a method is provided for controlling communication of a plurality of phased array antennas and a plurality of satellites, comprising: receiving an indication of data to be transmitted from a computing device to a satellite; determining available satellites for communication; directing the phased array antennas to steer towards a selected satellite; receiving received signal strength intensity (RSSI) signal from each phased array antenna; based on the RSSI signal selecting a phased array antenna for transmission; connecting the phased array antenna for transmission to a selected modulator; operating a router to connect the modulator to the computing device; and initiating transmission of the data to be transmitted.

In further aspects, a method for combining a transmission signals received at a plurality of antennas is disclosed, comprising: calculating a cross correlation coefficient for signals obtained from each of the plurality of antennas; selecting the signal generating the highest coefficient as a golden reference signal; using the golden reference signal to time-synchronize the transmission signals received at a plurality of antennas; deriving peak power to average power ratio for each of the transmission signals received at a plurality of antennas; using the cross correlation coefficients and the peak power to average power ratio to generate a weighting coefficient for each of the transmission signals received at a plurality of antennas; applying the weighting coefficient to each of the transmission signals received at a plurality of antennas to generate a plurality of weighted signals; and summing the plurality of weighted signals. As noted, the method may further include using the golden reference signal to calibrate the phase of the transmission signals received at a plurality of antennas.

According to other aspects, a system is provided for receiving a transmission signal, comprising: a plurality of antennas, each antenna receiving a received signal; a ranking module ranking the plurality of antennas according to quality of the received signal of each of the plurality of antennas and generating a corresponding level one signal, and selecting highest ranking antenna as a golden reference signal; a synchronizer using the golden reference signal to synchronize the received signals of all of the plurality of antennas; a level two module calculating peak to average power ratio for each of the received signal of each of the plurality of antennas and generating a corresponding level two signal; a scoring unit generating a weighting score for each of the received signal of each of the plurality of antennas using the level one and level two signals; a weighting module applying the weighting score to each corresponding received signal of each of the plurality of antennas to generate a plurality of weighted signals; and, a summing module combining all of the weighted signals.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

One or more embodiments of the present invention are illustrated by way of example and not limitation in the figures of the accompanying drawings, in which like references indicate similar elements and in which:

FIG. 5 illustrates a flow chart for steps that may be employed in a transmit process, while

DETAILED DESCRIPTION

Embodiments of the inventive real-time multiplexing antennas and control will now be described with reference to the drawings. Different embodiments or their combinations may be used for different applications or to achieve different benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

Incidentally, references made herein to a satellite, a platform, or a terminal are interchangeable and are only for illustration purposes. The physical locations may be swapped such that the steerable beam and its effects may originate on the satellite, the platform, terminal or all. The same is true for the receiving and transmitting—either side may be the receiving or the transmitting side and the use of the words either receiver or transmitter are for illustration only and not meant to limit the inverse or even simultaneous receive and transmit.

In many types of RF antennas, reception and transmission are symmetrically reciprocal such that a description of one equally applies to the other. In this description it may be easier to explain transmission, but reception would be the same, just in the opposite direction. Also, in the disclosed embodiments it is assumed that the disclosed antenna is mounted or integrated onto a platform, and its main beam is aimed at another antenna, herein sometimes referred to as the target. The antenna of the target is also mounted or integrated onto a platform, and either or both platforms may be moving. For example, the antenna may be mounted on a vehicle, such as an airplane, a ship, an automobile, etc., and the target may be mounted on, e.g., a satellite. The symmetry concept applies here as well, as the antenna may be the one that is mounted on the satellite, while the target may be mounted on a vehicle.

Figure 1:
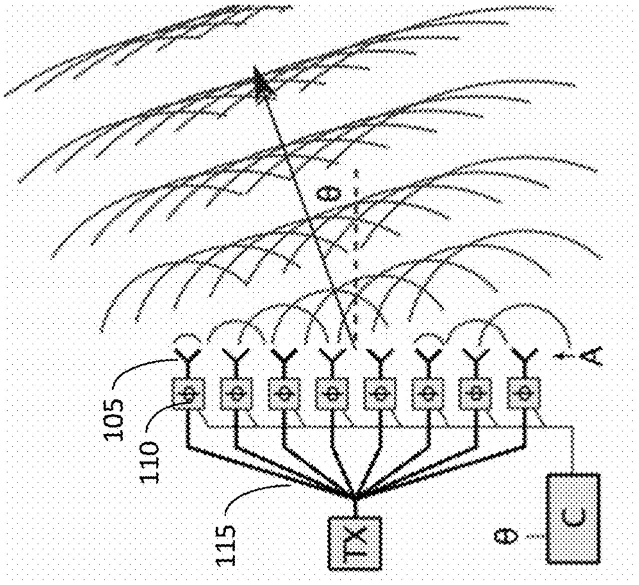
FIG. 1 illustrates an antenna array according to an embodiment, having a controller for individually controlling each phase shifter thereby steering the main beam.

FIG. 1 illustrates a phased array antenna, also referred to as electronically steerable or scanned array, which may be used in any of the embodiments disclosed herein. A phased array refers to an array of radiators forming a main beam, wherein the direction of the main beam is electronically steerable by changing the phase/time delay of the RF energy arriving at each of the radiators. For simplicity, the illustration shows a linear array, but for the disclosed embodiments it is more beneficial to utilize a two-dimensional array, such that the beam can be steered in two dimensions. The array comprises radiating elements 105, each connected to a phase shifter 110. Each of the phase shifters 110 may be in the form of a delay line. The phase shifters 110 are controlled by a computer C to introduce a certain amount of delay in the corresponding transmission lines and thereby steer the beam from boresight by an angle θ.

The transmitter TX generates the signal, which is applied to a corporate feed 115, which splits the signal to be delivered to each of the radiating elements 105. Prior to reaching the radiating element, the signal from the feed passes through the corresponding phase shifter 110 such that the phase of the signal in each delay line is changed by an individual amount to cause the beam to steer. The phase shifters 110 can also be controlled by an on-chip processor or baseband processor. The range of each phase shifter can be quantized into a look-up table (LUT). The beam can be steered by quickly retrieving a phase value from the memory. The reverse happens for reception.

The example illustrated in FIG. 1 is a passive phased array or passive electronically scanned array (PESA), which is a phased array in which the antenna elements are connected to a single transmitter and/or receiver. However, the disclosed embodiments are not limited to PESA, but rather encompass any electronically steerable antenna. For example, an active phased array or active electronically scanned array (AESA) may also be used. AESA is a phased array in which each antenna element has an analog transmitter/receiver (T/R) module which creates the phase shifting required to electronically steer the antenna beam. Any of the disclosed embodiments may also be implemented using a digital beam forming (DBF) phased array, which has a digital receiver/exciter at each element in the array. The signal at each element is digitized by the receiver/exciter, so that antenna beams can be formed digitally in a field programmable gate array (FPGA) or the array computer 110. This approach allows for multiple simultaneous antenna beams to be formed, e.g., by grouping the radiating elements into sub-groups.

Also, the subject assignee has developed a phase array antenna wherein the phase shifters are formed using delay lines that traverse variable dielectric constant material, such as, e.g., liquid crystals. Such phased array antenna is also suitable for embodiments disclosed herein. Examples of such arrays are described in, e.g., U.S. Pat. No. 7,884,766; and published applications US2017/0093363; US2018/0159213; and US2018/0062272; the content of which is incorporated herein in their entirety by reference.

In general, it should be appreciated that for each of the disclosed embodiments, each antenna is any electronically steerable antenna having plurality of radiators, such as the phased array antenna similar to the example illustrated in FIG. 1. For simplicity, the disclosure provided herein uses the term “phased array antenna”, but it should be appreciated that the term encompasses any electronically steerable antenna having plurality of radiators forming a radiation pattern the direction of which can be steered electronically.

Figure 2:
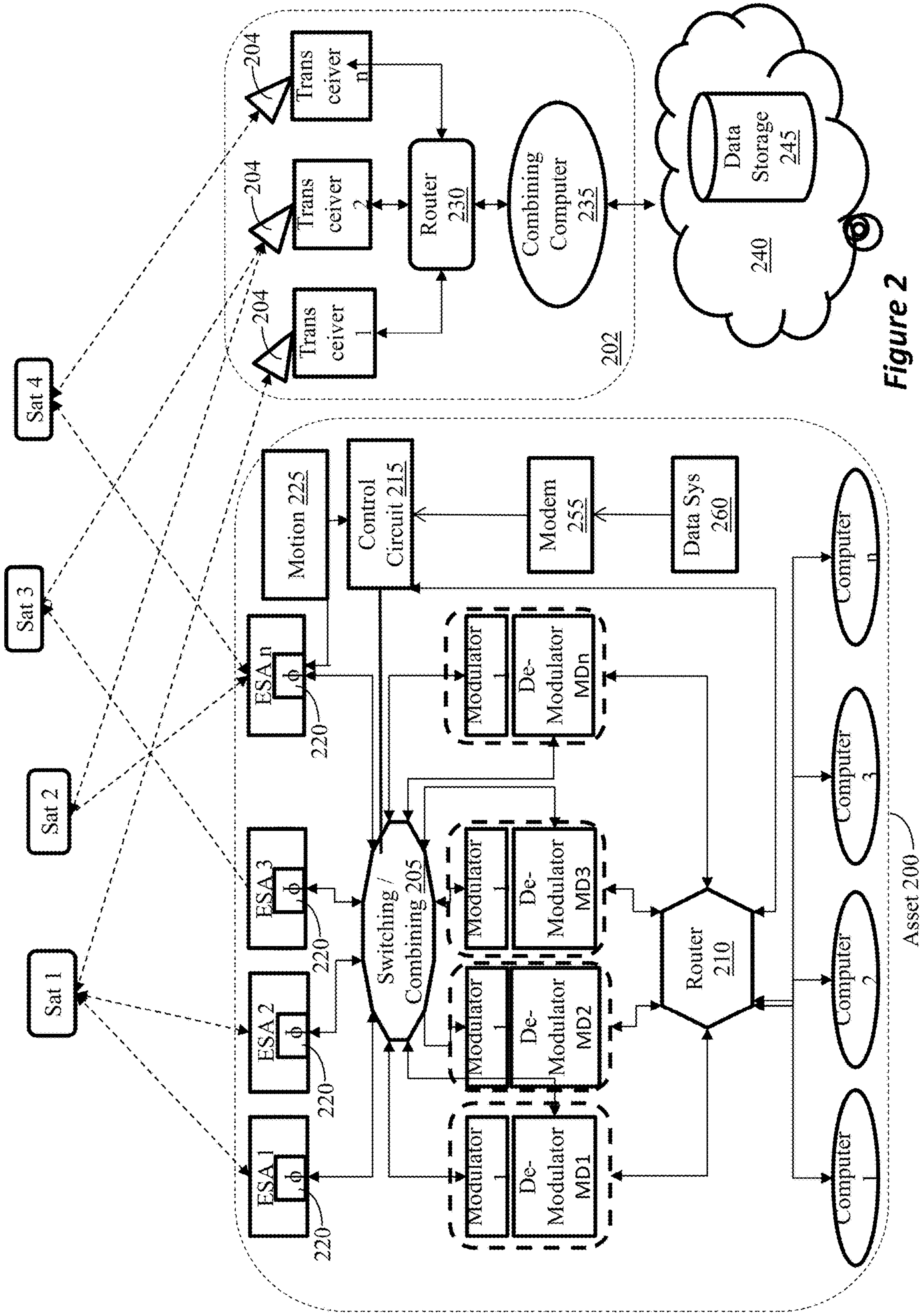
FIGS. 2 and 2A illustrate embodiments for deployment of multiple phased array antennas for communication with one or more satellites.

FIG. 2 illustrates an embodiment for deployment of multiple phased array antennas for communication with one or more satellites. The arrangement of FIG. 2 enables continuous, in real time, reconfiguration of the multiple phased array antennas. In FIG. 2, asset 200 may be any platform having multiple communication devices, such as computers 1-*n*, that communicate with one or more satellites 1-4. The asset 200 may be, e.g., an airplane, a ship, a train, or a land based installation.

The asset includes a plurality of antennas ESA1-ESAn, that are coupled to a plurality of modems MD1-MDn via a switching mechanism 205. Each of the antennas has a phased array having its beam shape and direction controlled by phase controller 220. The phase controller 220 sets the phase or time delay of the signal for each of the radiators of the phased array to form the required main beam pointing at the desired direction. The term phase controller is used herein as shorthand to indicate any controller used to electronically steer the beam formed by the radiators. For example, the phase controller 220 may control the time delay of the single-source RF signal as it is applied to each of the radiators. In another example, the phase controller 220 may be a field programmable gate array digitally forming the antenna beam.

In some embodiments the phase controller 220 may maintain a database, e.g., a lookup table, listing all of the available satellites and their location in the sky. In some embodiments the phase controller 220 may receive GPS coordinates and other motion data of asset 200 from motion circuitry 225 so as to be able to determine which satellites are within the field of view of its phased array. The phase controller 220 may use this information to steer the beam of each phased array to the appropriate direction towards the satellites.

In some embodiments, the phase controller 220 includes a control port which receives a control signal from the control circuit 215 indicating with which satellite the antenna is to communicate with. The control circuit 215 may include a data port that is in functional connection with the router 210, so that the control circuit can actively base its switching decisions based on data collected from the router 210. The data may include bandwidth available for each antenna, data transmission rate for each antenna, type of transmission required by each communication device 1-*n* (voice, video, data, etc.).

The control circuit may also be connected to each of the ESA’s and obtain RSSI signal from each of the EAS’s. The control circuit may further be connected to modem 255 and receive other data relevant to its switching decision, e.g., service level assigned to each communication device, cost of transmission for each satellite, etc. For example, the modem 255 may be coupled to an external data and management system 260 which is providing data to the control circuit 215 regarding various transmission parameters and users’ accounts.

Using its database the phase controller calculates the phase delay applied to each signal of each of the radiators so as to point the antenna in the direction of the indicated satellite. When the asset 200 is a mobile unit, e.g., an airplane, a boat, etc., the motion circuitry 225 continuously sends motion signals to the phase controller 220 so that the phase controller can continuously adjust the phase applied to each radiator so as to keep steering the beam towards the satellite.

The plurality of communication devices, here shown as computers 1-*n*, is coupled to the modems MD1-MDn via the router 210. This arrangement enables real-time configuration of the system, such that any communication device 1-*n* can be coupled to any of the modems MD1-MDn, which can be coupled to any of the antennas ESA1-ESAn. This enables efficient utilization of the bandwidth available from the satellites.

The multiple users on the platform may have varying needs, e.g., perhaps one computer is for crew welfare watching Netflix, while another is managing the ship’s navigation. The control circuit 215 can determine which satellites to send the respective traffic over, and which antenna or antennas to use for that specific communication. The control circuit 215 could also command the router 210 to aggregate the capacity or perform other Ethernet level operations on the traffic to ensure the highest quality, best performance and lowest cost across all the available paths.

For example, in some embodiments the control circuit 215 receives data regarding the bandwidth capacity and utilization of various satellites, data regarding the transmission priorities, e.g., live signal such as voice or video calls must have high priority, while email can be allocated low priority, data regarding bandwidth cost of various services available on the satellites, etc. The control circuit 215 can then determine which satellite should be used for which transmission. Also, in some embodiments the control circuit receives the motion signal from the motion circuitry 225, so that the control circuit 215 can determine which satellites may be available for which antenna. In some embodiments the control circuit 215 also stores in its database the physical configuration of asset 200 and its antennas. For example, the asset may have ESA1 on its right side, ESA2 on its left side, ESA 3 on the roof, etc. From this the control circuit 215 may determine which part of the sky each antenna may be able to scan. Using all this information, the control circuit 215 can provide the appropriate signals to the switch and router to make the proper connections, and to indicate to each phase controller where to aim the antenna at.

To illustrate, FIG. 2 shows that both antennas ESA1 and ESA2 communicate with Sat1, which in turn communicates with transceiver 1. So, in one example, the signal from Sat1 is too weak to send the required file over a single connection, the file can be sent over two connections using receive diversity combining methodology over ESA1 and ESA2 as one possible solution. ESA3 communicates with Sat3, which in turn communicates with transceiver 2. ESAn communicates with both satellites Sat2 and Sat4. Sat2 communicates with transceiver 2, while Sat4 communicates with transceiver n. The two signals are routed by router 230 to be combined by combining computer 235.

The example illustrated in FIG. 2 shows transceivers 1-3 being part of a single base station 202 that is connected to a network 240, e.g., the Internet. Data storage 245 may be accessed via the network 240, or may reside in the base station itself. Of course, many base stations may be employed and the satellites may communicate with any selected base station, depending on the user needs, the performance of each base station, the connections available, etc. Also, since data storage 245 may be accessed via the network 240, when a particular user machine needs to access the data storage 245, the control circuit 215 may determine which satellite and which base station are best suited to serve that connection. Therefore, in some embodiments the control circuit 215 may periodically receive transmission with data regarding the available base stations and their operational parameters. Similarly, for non-stationary satellites the control circuit 215 may periodically receive transmission with updates regarding the satellites' location and operational parameters.

Each of the transceivers of base station 202 has an antenna 204 that exchanges communication signals with one or more satellites. For communications with stationary satellites the antenna 204 may be a simple dish that is fixed in the direction of the satellite, or moved mechanically to steer it towards a desired satellite. However, for rapid, real-time steering, e.g., for non-stationary satellites or for fast moving between different satellites, one or more of antennas 204 may be a phased array as disclosed herein.

In some disclosed embodiments, the satellites' transmission and reception is done via a unidirectional transmission mechanism. For example, the satellites' transmission and reception may employ the user datagram protocol (UDP).

Figure 3:
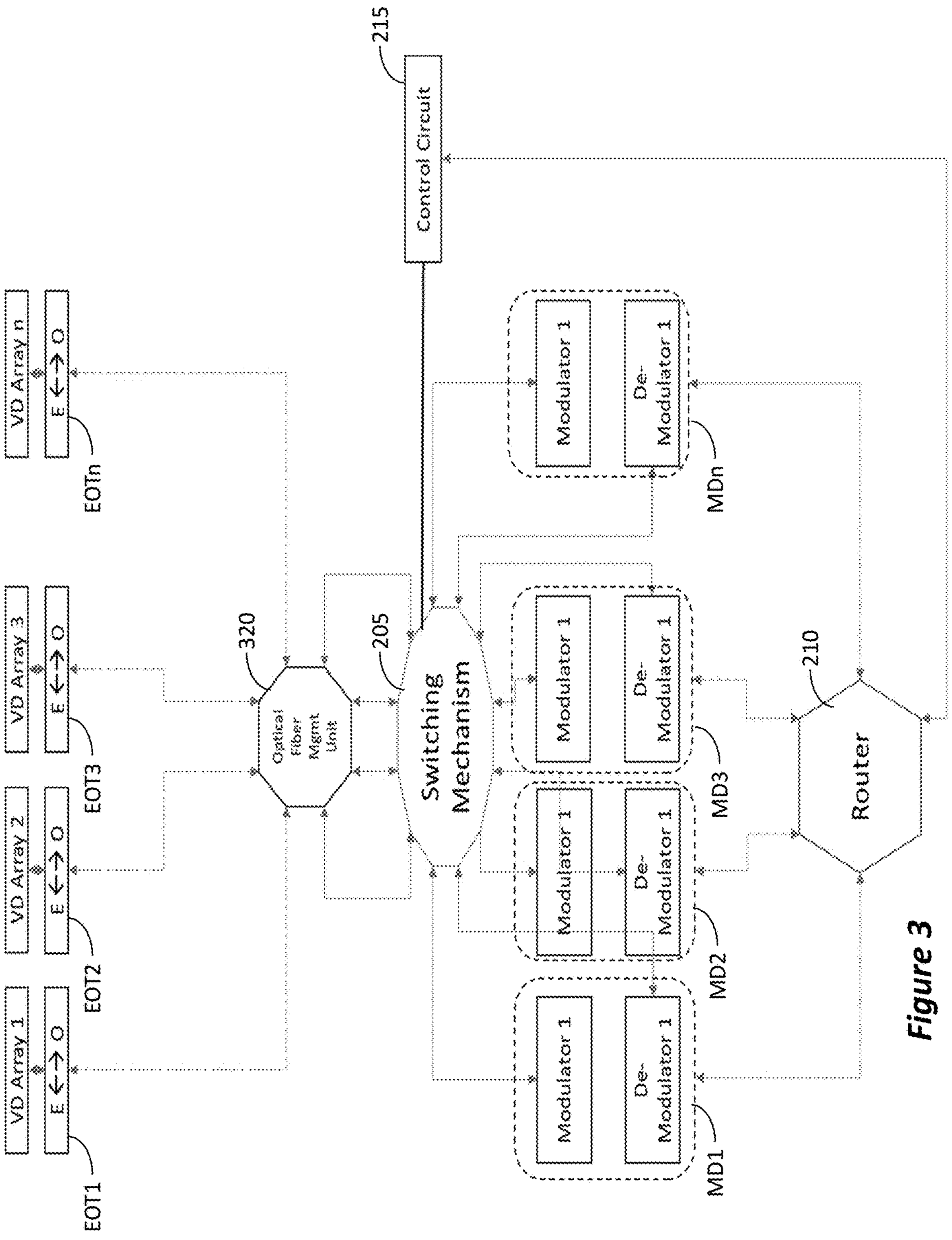
FIGS. 3-3B illustrates embodiments utilizing fiber optics for fast and efficient management of the multiple signals.

FIG. 3 illustrates an embodiment utilizing fiber optics for fast and efficient management of the multiple signals. Each of the phased array antennas includes an electro-optical transceiver EOT1-EOTn to convert between light signals and electrical signals. The optical signal travels in optical fibers, illustrated in dash-line arrows, that are managed by optical fiber management unit (OFMU) 320. The OFMU 320 also includes an electro-optical modulator that converts between optical and electrical signals. The signals traveling between the OFMU 320 and the switch 205 are electrical, and travel in wave guides, coaxial cables, etc., which is shown in solid-line arrows.

With the illustrated example of FIG. 3, the OFMU 320 can connect any phased array antenna 1-*n* to any modem MD1-MDn via switch 205. Also, the optical fiber management unit 320 can sum the RF signal from multiple selected phased array antennas and present the summed RF signal to a selected modem. Conversely, the optical fiber management unit 320 may sum the transmit power to multiple selected antennas for transmission. Furthermore, the OFMU 320 can perform other digital baseband operations to create nulling, beam forming, or interference cancellation.

Figure 3A:
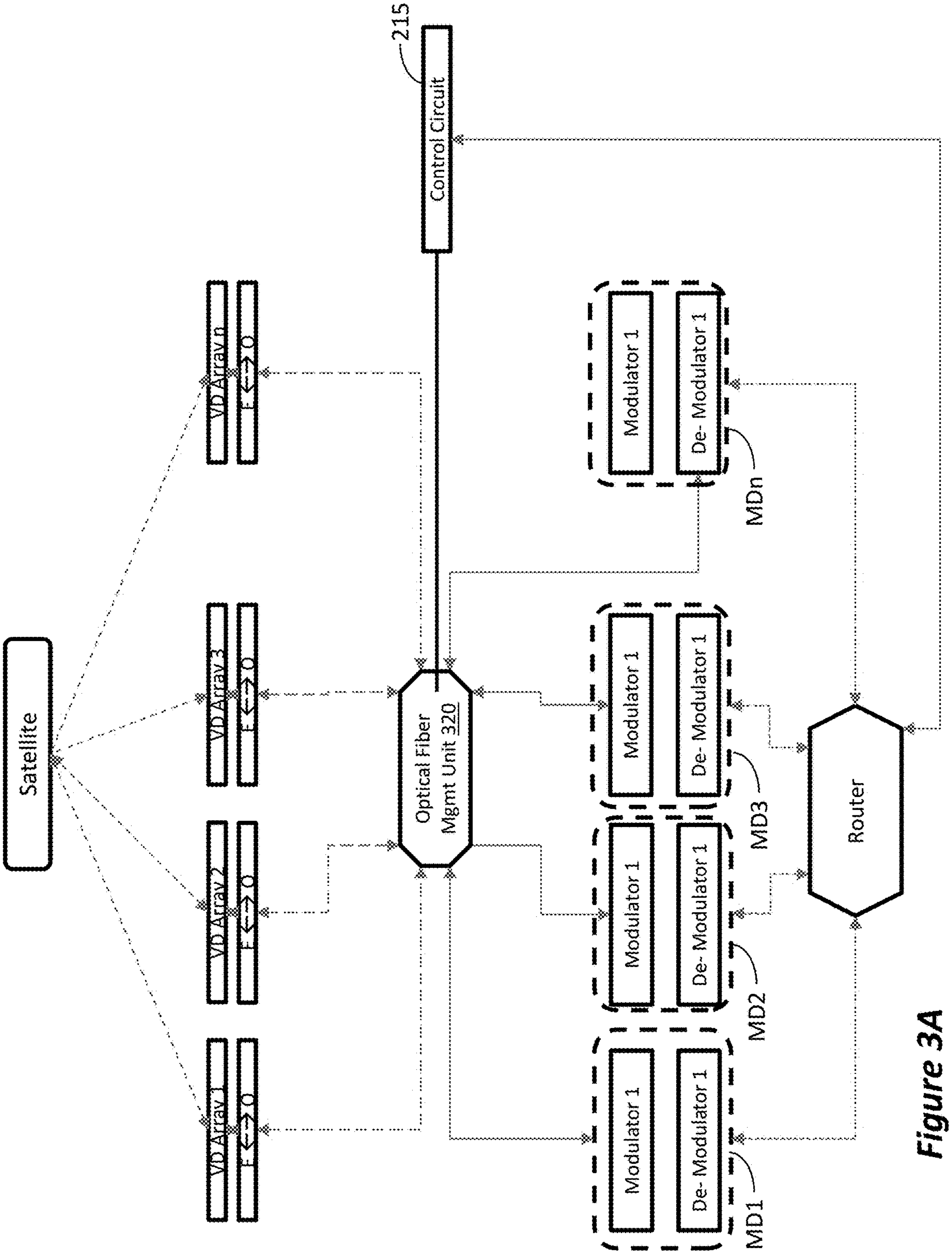

FIG. 3A illustrates a modification of the embodiment of FIG. 3, wherein the optical fiber management unit 320 additionally performs the functions previously performed by switch 205. Since the fiber optics management unit 320 is capable of combining and splitting signals, it can direct the signals to any of the modulators MD1-MDn, thus obviating the need for switch 205. The control circuit 215 then sends its instructions signals to the OFMU 320 to make the proper signal routing.

Figure 4:
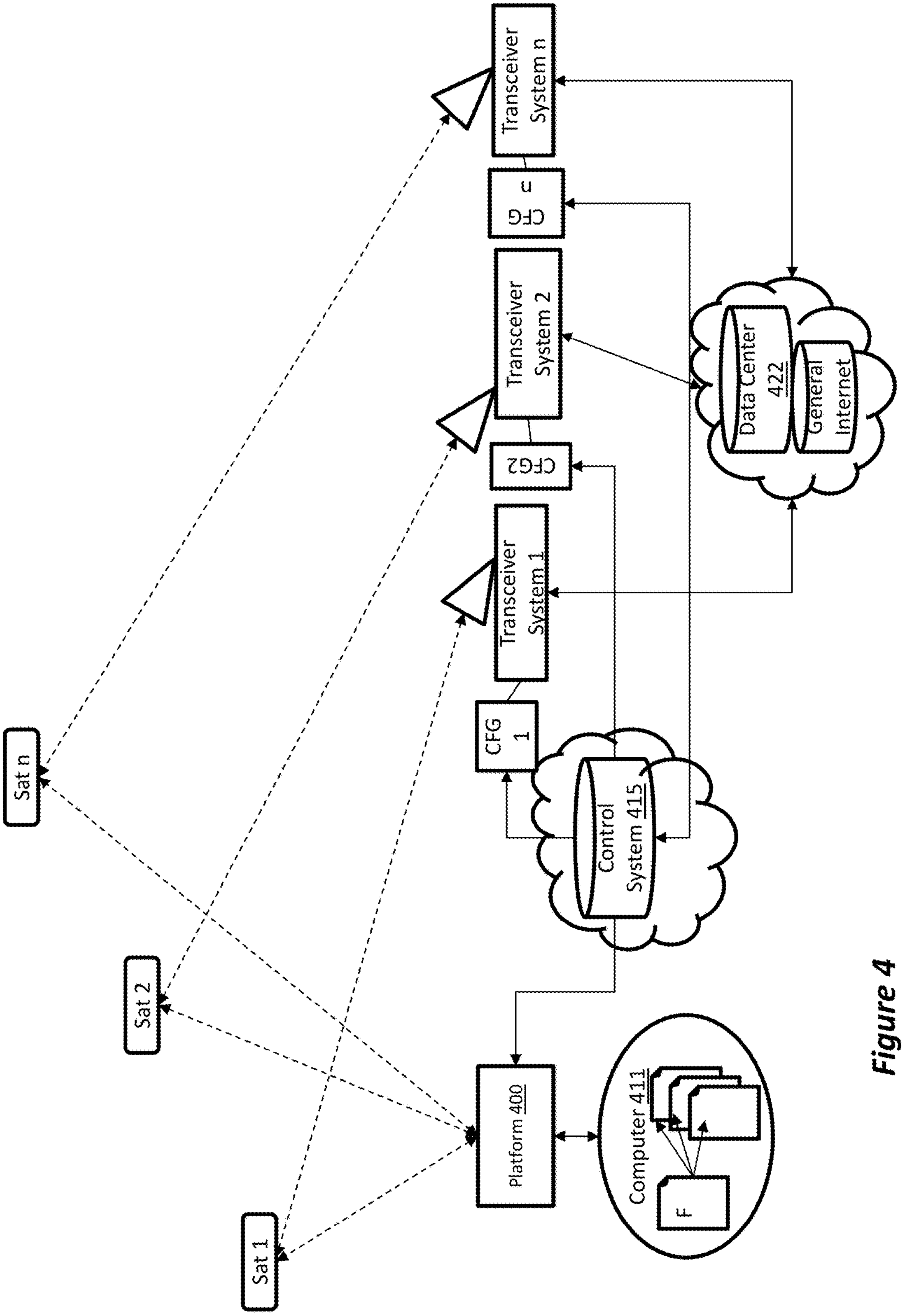
FIG. 4 illustrates an example of generating path diversity which is beneficial especially for secure transmission of files or for load balancing.

FIG. 4 illustrates an example of generating path diversity which is beneficial especially for secure transmission of files or for load balancing. In the example illustrated in FIG. 4, platform 400, which may be any of the platforms described herein having one or more phased array antenna(s), includes a computer 411 and is attempting to send a file F. In some examples, the data in the file is sensitive and it is desirable to frustrate a man-in-the-middle attack, such that even if it is successful, the perpetrator would only get part of the data. In other examples, it may be determined that the file is too large for the detected RSSI so that it is desirable to use more than one path, wherein each path carries only part of the file.

As illustrated in FIG. 4, computer 411 splits file F into several, here three parts. The control system 415 then operates the switch and router (see FIG. 1) to create three transmission paths, each directed at one satellite. In the example illustrated in FIG. 4, each satellite communicates with a different base station, such that each part of the file is received by a different antenna and transceiver system. This is not always necessarily the case, as some or all of the satellites may be communicating with the same base station. Regardless, the control system 415 indicates to the base stations via configurator CFG1-CFGn which file to receive from which satellite, and indicates to the data center 422 that when the parts of the files are received, they are to be assembled into a single file, which may be assembled and stored at the data center 422. Of course, any return response can be similarly split and sent over multiple paths.

Note that in the example of FIG. 4 the control system 415 is residing in the cloud and not on the platform 400. Such an arrangement is not limited to this particular example, but may be employed in any of the embodiment disclosed herein.

Figure 5A:
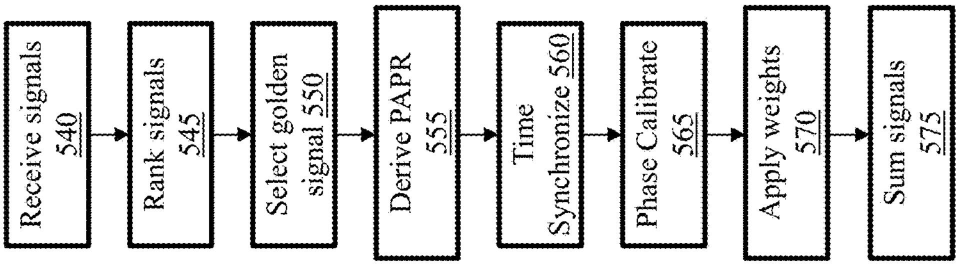
FIG. 5A illustrates steps that may be employed in a receive process according to embodiments.
Figure 5:
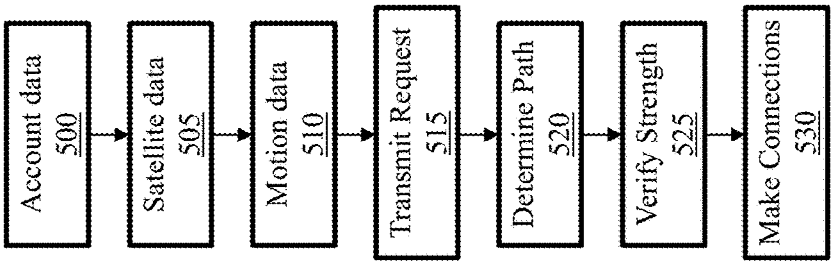

FIG. 5 is a flow chart illustrating non-ordered steps that may be taken in a process implemented by disclosed embodiments. For example, in step 500 account data for registered users is loaded onto the control circuit 215. The account data may include data speeds, data rate prices, data limits, etc. The account data may be stored in the memory of the control circuitry. In step 505 satellite data may be loaded onto the control circuit 215. The satellite data may include satellite ID, satellite coordinates, transmission rate, bandwidth, etc. In step 510 motion data may be uploaded onto the control circuit 215. The motion data may include motion data relating to the satellites and motion data relating to the platforms upon which the ESA's are mounted. Note that all of the data uploaded in steps 500, 505 and 510 may be updated periodically.

In step 515 a transmission request is received from a user. Using the information in the transmission request, and the data uploaded in steps 500, 505 and 510, in step 520 a proper path(s) is selected for the transmission. For example, if multiple antennas are available, the transmission can be performed over multiple paths using multiple antennas, e.g., employing the diversity combining methodology. In step 525 the transmission/reception strength is verified for the antenna(s) in the path selected. This may be done by, e.g., receiving the RSSI from each unit. When the proper signal strength for the selected path is verified, the switch is set to connect the selected antenna(s) to the selected modem(s) and the router is set to connect the user's machine to the selected modem(s).

Figure 6:
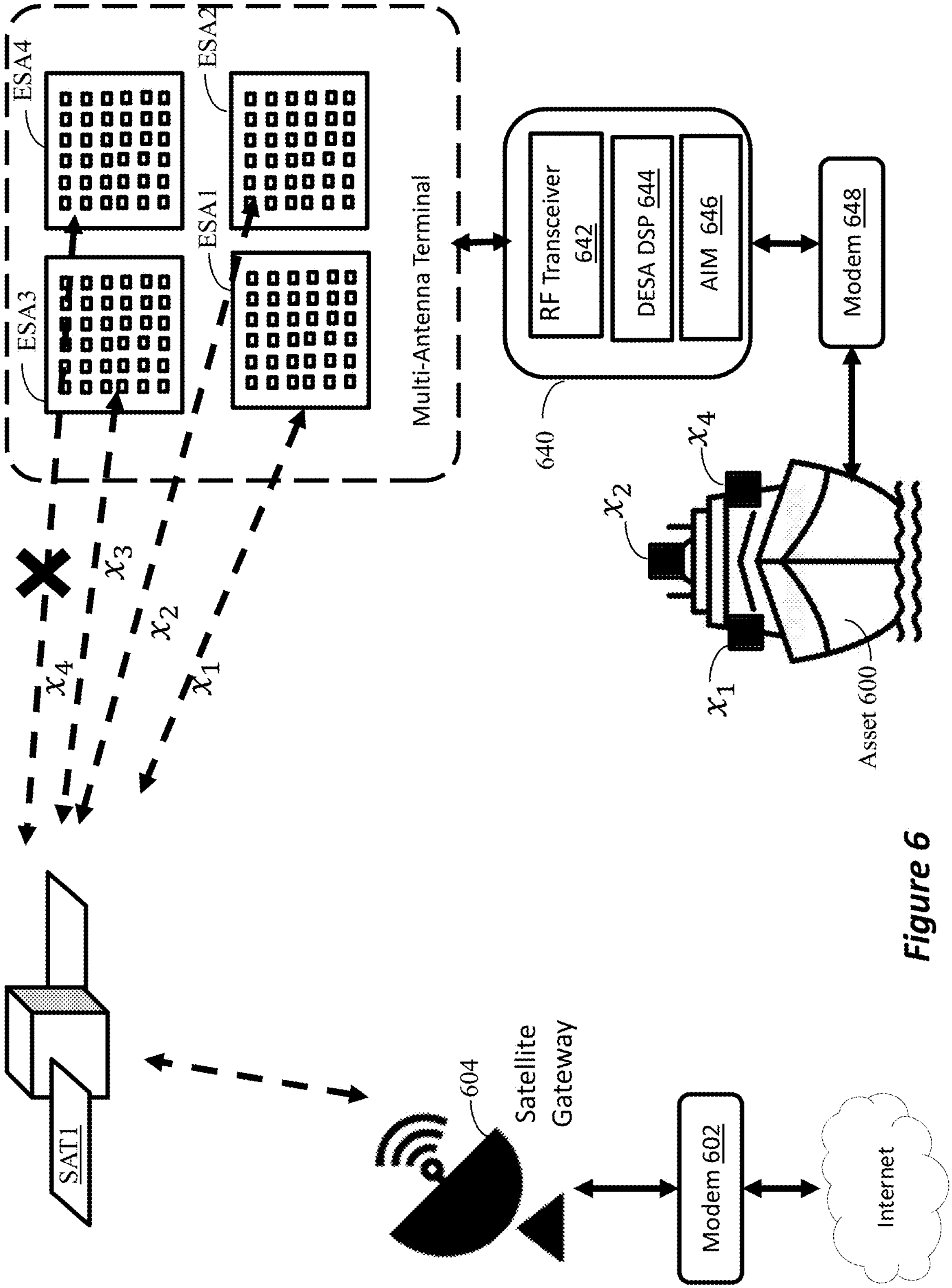
FIG. 6 illustrates an architecture of employing multiple antennas for receive diversity combining method according to an embodiment.

FIG. 6 illustrates an example of an embodiment utilizing multiple antennas, e.g., multiple phased arrays, to improve the overall signal to noise ratio (SNR) of the received signal. Utilizing multiple antennas to improve the SNR of a received signal is known in the art, but current implementations are either inadequate or too complicated/expensive for wide implementation. For example, the simplest implementation is to determine which antenna provides the strongest total instantaneous signal (e.g., highest RSSI) and select that antenna's signal. Another fast method is to simply apply equal weight to each antenna and sum up the weighted signals from all of the antennas. While such an approach is fast and easy to implement, it loses signal quality of the best antenna and may weight a weak signal too highly, thereby introducing noise. For further information the reader is directed to D. R. Pauluzzi and N. C. Beaulieu, "A comparison of SNR estimation techniques for the AWGN channel" IEEE Transactions on Wireless Communications, Vol. 48, No. 10, October 2000. Available at: https://ieeexplore.ieee.org/document/871393. The embodiment of FIG. 6 provides an improved weighting using a novel approach that is fast and relatively simple to implement.

The architecture illustrated in FIG. 6 is referred to as Distributed Electronically Steerable Arrays (DESA), and since in the example of FIG. 6 the multiple arrays are used to combine a diversity received signal, it may be referred to as receive diversity combining architecture for DESA. Such an architecture is especially beneficial when one or more of the arrays do not have clear view of the satellite or due to the beam tilt angle have a very small aperture. This is exemplified in FIG. 6 by considering a mobile platform 600, such as a ship, wherein the antennas are positioned in different sections of the ship. The ship may be traveling in a direction wherein the satellite is on its starboard, such that arrays $x_1$, $x_2$ and $x_3$ ($x_3$ not shown, e.g., on the stern), may have a good signal, but since $x_4$ is positioned on port side, it may not be able to steer towards the satellite, or the angle of steering may cause a very small aperture, thus noisy signal.

Modem 602 conditions the signal for transmission, e.g., signal from the Internet, such as streaming video, etc. The signal is uploaded to the satellite SAT1 from base station 604 and the satellite SAT1 broadcasts it down to earth. The signal may be picked up by some or all of the antennas $x_1$-$x_4$, each having an individual SNR due to a variety of factors such as propagation loss, weather dynamics, polarization mismatch, interference, physical orientation of the array, etc. The signal from the arrays is then processed by the DESA processing unit 640 to generate a digital signal that is provided to modem 648, which then transmit the signal to the various user devices. The DESA processing unit 640 includes an RF transceiver 642 that receives and digitizes the signals from the antennas, and a digital signal processor 644 that determines the weights to apply to the signal from each of the antennas, and then sums the weighted signals. The DESA processing unit 640 also includes Antenna Interface Module AIM 646, which is the controller responsible for steering, geolocation and system management of the phased-array antennas. AIM 646 may have the structure and provide operations and functions similar to those described with respect to phase controller 220 of FIG. 2.

Figure 7:
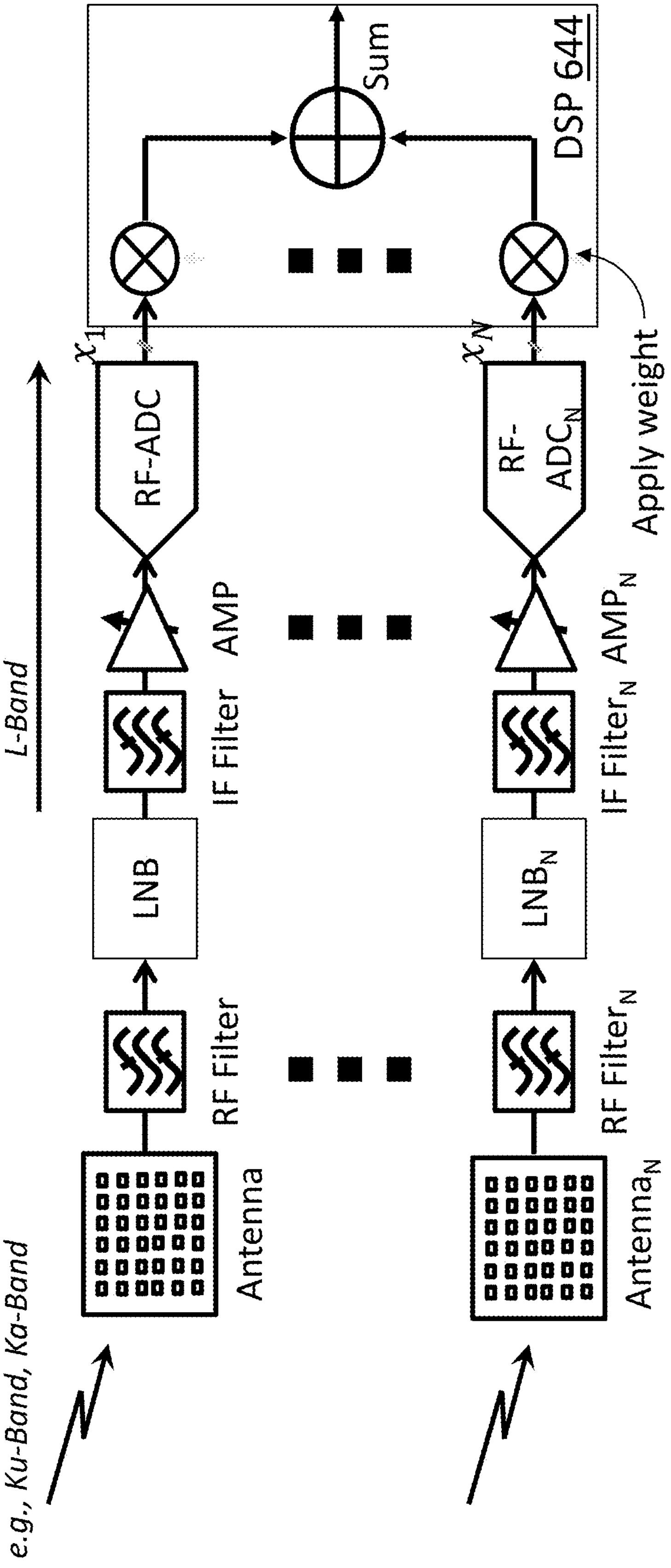
FIG. 7 illustrates structure of the channels in a receive diversity combining architecture according to an embodiment.

FIG. 7 illustrates an embodiment of the receive signal path that may be used for receive diversity combining architecture, such as illustrated in the example of FIG. 6. The example of FIG. 7 includes as many channels as antennas, wherein only the first and last channels are illustrated in details, while the rest are indicated by ellipses as they are all identical. The disclosed approach is frequency band agnostic, so it can be applied to any frequency band. Each antenna receives the satellite signal and, to illustrate, in this example the transmission is in the Ka or Ku band. The signal passes through an RF filter and is then applied to a standard Low Noise Block (LNB) which down-converts the signal to an intermediate frequency, which is in the L-band. After the signal passes the intermediate frequency filter, it is amplified and converted into a digital signal by the RF ADC converter. The digital signal processor DSP 644 then applies a calculated weight to each channel and sums the signals from all of the channels.

Figure 8:
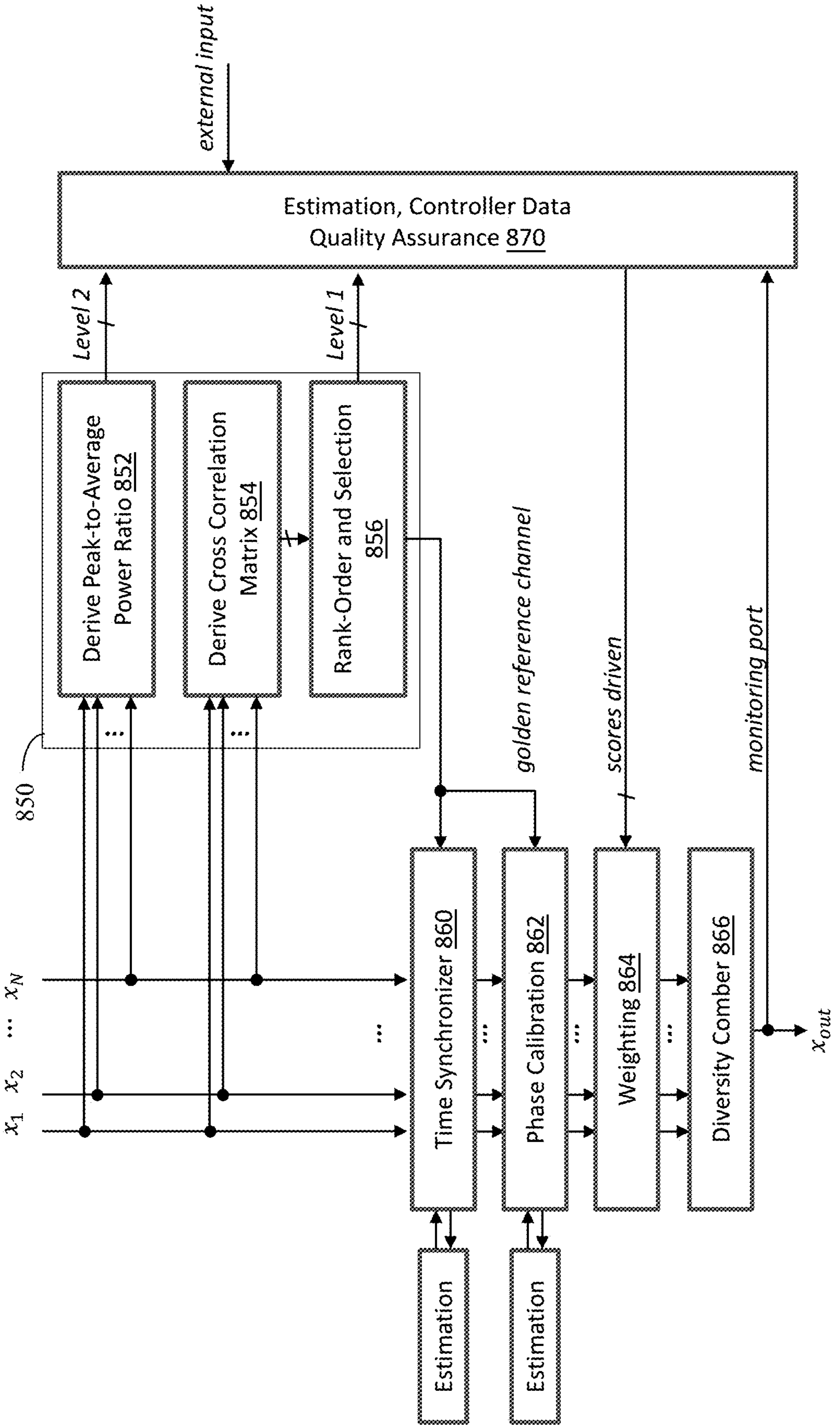
FIG. 8 illustrates architecture of digital signal processing for receive diversity combining according to an embodiment.

FIG. 8 illustrates an example of a digital signal processor that may be employed to support the receive diversity combining architecture according to embodiments disclosed herein. Due to path differences and other atmospheric effects, the signal of the channels needs to be synchronized and calibrated to match each other. In the embodiment of FIG. 8 this is done by the channel scanner 850 first determining the channel of highest fidelity by comparing each channel's correlation with the rest of channels. In essence, channel scanner examines the channels to select the most trustworthy channel as the golden reference channel. The golden reference channel is used by the time synchronizer 860 to estimate the time shift required to time-align all the channels. In one example, for each receive channel $Rx_N$ the time synchronizer 860 up-samples the signals to achieve desired fractional-sample accuracy. It then determines the cross correlation of the receive channel with the golden reference channel. It then sets the maximum coefficient value as the path delay difference and uses it to align the receive channel $Rx_N$ to the golden reference sample.

Similarly, the golden reference channel is used by the phase calibration module 862 to estimate the phase shift required to align all the channels. In one example, for each receive channel $Rx_N$ the phase calibration module 862 calculates the mean value of the phase difference between the receive channel $Rx_N$ and the golden reference channel. It then applies the mean phase error value to the receive channel $Rx_N$.

As noted, the channel scanner 850 ranks the channels according to their relative fidelity or trust worthiness. This is done by first deriving a cross correlation matrix by the cross correlation module 854. The results of the cross correlation are used by the ranking module 856 to generate a rank order of the channels, which is referred to herein as level 1 ranking, and to select the golden reference channel. The level 1 signal is provided to the rank controller 870.

In this respect, the cross correlation matrix is derived as:

$$CC_{m,n} = \max\left\{\left|\frac{1}{ns}\sum_{\tau}^{nd}\sum_{t}^{ns}\overline{x_m[t]}\cdot x_n[t-\tau]\right|\right\}$$

where m≠n, ns is the integration length, and nd is the delay search window. For N-channel receiver, the expression generates d number of cross correlation coefficients, where $d=\Sigma_1^{N-1}i$ is an integer, according to the triangle of the square matrix below.

$$CC_{m,n} = \begin{bmatrix} CC_{1,1} & CC_{1,2} & CC_{1,3} & CC_{1,4} & \ldots & CC_{1,n} \\ CC_{2,1} & CC_{2,2} & CC_{2,3} & CC_{2,4} & \ldots & CC_{2,n} \\ CC_{3,1} & CC_{3,2} & CC_{3,3} & CC_{3,4} & \ldots & CC_{3,n} \\ \ldots & & & & & \ldots \\ \ldots & & & & & \ldots \\ CC_{m,1} & CC_{m,2} & CC_{m,3} & CC_{m,4} & \ldots & CC_{m,n} \end{bmatrix}$$

For example, for N=4, the expression generates an array of $\Sigma_1^3 i=6$ coefficients:

$$CC_{m,n} = [CC_{1,2}, CC_{1,3}, CC_{1,4}, CC_{2,3}, CC_{2,4}, CC_{3,4}]$$

The coefficients obtained from the matrix are used for level 1 ranking determination. A Q-matrix of dimension N by N−1 is defined, where each channel data is used exactly N−1 times from the correlation matrix calculation. The correlation sum (CS) associated with each n-th channel is computed by adding all the row elements of Q as given by:

$$CS_n = \sum_{i \neq n} CC_{n,i} + CC_{i,n}$$

For the example of N=4 the expression is:

$$\begin{Bmatrix} x_1 \\ x_2 \\ x_3 \\ x_4 \end{Bmatrix} \rightarrow Q = \begin{bmatrix} CC_{1,2} & CC_{1,3} & CC_{1,4} \\ CC_{1,2} & CC_{2,3} & CC_{2,4} \\ CC_{1,3} & CC_{2,3} & CC_{3,4} \\ CC_{1,4} & CC_{2,4} & CC_{3,4} \end{bmatrix} \rightarrow$$

$$CS = \begin{bmatrix} CC_{1,2} + CC_{1,3} + CC_{1,4} \\ CC_{1,2} + CC_{2,3} + CC_{2,4} \\ CC_{1,3} + CC_{2,3} + CC_{3,4} \\ CC_{1,4} + CC_{2,4} + CC_{3,4} \end{bmatrix} = \begin{bmatrix} CS_1 \\ CS_2 \\ CS_3 \\ CS_4 \end{bmatrix}$$

The golden reference channel is selected based on the highest score as defined in the set:

$$\text{SCORE} = \varphi_{CS}\left(\frac{CS}{\sum_i CS_i}\right)^N = [\text{SCORE}_1, \ldots ,$$

$$\text{SCORE}_N] = \left[\varphi_{CS}\left(\frac{CS_1}{\sum_i CS_i}\right)^N, \ldots , \varphi_{CS}\left(\frac{CS_N}{\sum_i CS_i}\right)^N\right]$$

where φ is a gain function comprised of a normalizer and scaler. In the case of a tied score, it is possible to select one of the tied channels, or, in this embodiment use the results of the level 2 ranking determination to select the golden reference channel for higher accuracy.

Referring back to FIG. 8, the channel scanner 850 includes a peak to average power module 852, which calculates the level 2 ranking based on peak to average power ratio (PAPR). The level 2 signal is applied to the rank controller 870, which uses the level 1 and level 2 determinations to generate the scores for the channels. The scores are provided to the weighting module 864 which applies the weights assigned to each channel, and then the weighted signal of all the channels is combined by diversity combiner 866. Incidentally, as shown by the example of FIG. 8, an optional external input port is provided, enabling a user to override the rank controller's selection or provide other commands to the rank controller 870.

The level 2 ranking determination is based on calculating PAPR, using the expression:

$$PAPR = \frac{\max\{|x|^2\}}{\frac{1}{K}\sum_{i=1}^{K} x_i \bar{x}_i}$$

In this example the peak power is less than 1005 of maximum amplitude squared, e.g., $\max\{|x|^2\}$ corresponds to 99% PAPR in a collection window of K samples. Using 99% PAPR avoids unrealistic peaks due to system error, glitch or sampling error. While this particular example uses 99%, any other value may be used that is less than 100%. Higher PAPR implies worse radiowave propagation channel and reduced Eb/NO (energy per bit to noise power spectral density ratio–a normalized signal-to-noise ratio (SNR) measure, also known as the "SNR per bit").

Ideally, level 1 max(CS) and level 2 min(PAPR) should correspond to the same receive channel. The reference channel selection can be computed by joint scores:

$$\text{SCORE}_n = \left(\varphi_{CS}\left(\frac{CS_n}{\sum_i CS_i}\right) \cdot \varphi_{PAPR}\left(\frac{\sum_i PAPR_i}{PAPR_n}\right)\right)^N$$

Generally a scoring method may employ several decision variables based on multiple physical quantities. As indicated above, the example of FIG. 8 utilizes a cross correlation sum as level 1 ranking and PAPR as level 2 ranking. By having another decision variable, PAPR, we can better approximate the true channel SNR, and hence closer to the optimal combining solution. Additionally, other variables may be used, e.g., total signal-plus-noise power (Psig). Therefore, a generalized description of determining the n-th channel score for N multiple Rx channels can be expressed as:

$$\text{SCORE} = \left(\prod_{q=1}^{Q} \varphi_q(\theta_q)\right)^N$$

where $\text{SCORE}=[\text{SCORE}_1, \text{SCORE}_2, \ldots, \text{SCORE}_N]$ is an array of dimension N, Q is the total number of decision variable, φ is the gain function for normalization, and θ is a scalar function. Ideally, level 1 max(CS) and level 2 min (PAPR) should correspond to the same receive channel. The reference channel selection can be computed by joint scores for a better approximation of true channel condition:

$$\text{SCORE}_n = \left(\varphi_{CS}\left(\frac{CS_n}{\sum_i CS_i}\right) \cdot \varphi_{PAPR}\left(\frac{\sum_i PAPR_i}{PAPR_n}\right)\right)^N$$

where n is the channel number that gives the highest score.

For the example given in FIG. 8, where Q=2 (level 1 ranking and level 2 ranking) and N=4 channels, the expression for obtaining the scores is:

$$\text{SCORE} = (\varphi_1(\theta_1)\cdot\varphi_2(\theta_2))^4 = \left(\varphi\left(\frac{CS}{\sum_i CS_i}\right)\cdot\varphi\left(\frac{\sum_i PAPR_i}{PAPR}\right)\right)^4$$

which is the value used in the weighting coefficients of weighting module 864. Channels with better condition and higher quality will be weighted exponentially more, presenting a higher SNR at the output of the diversity combiner 866.

Also shown in FIG. 8 is the monitoring port leading to controller 870. In this embodiment, controller 870 monitors the output of the diversity combiner 866 and determines the noise variance of the output. This may be done, for example, by using the same PAPR process described above. The controller 870 may compare the PAPR determined for the diversity combined signal with respect to the PAPR calculated for each of the incoming signal. This is done so that the controller 870 monitors that the signal generated after the diversity combining has indeed lower PAPR and, if not, the weights may need to be varied to achieve a reduction in the PAPR of the diversity combined signal.

With the provided disclosure, a method for combining a transmission signals received at a plurality of antennas is disclosed, comprising: calculating a cross correlation coefficient for signals obtained from each of the plurality of antennas; selecting the signal generating the highest coefficient as a golden reference signal; using the golden reference signal to time-synchronize the transmission signals received at a plurality of antennas; deriving peak power to average power ratio for each of the transmission signals received at a plurality of antennas; using the cross correlation coefficients and the peak power to average power ratio to generate a weighting coefficient for each of the transmission signals received at a plurality of antennas; applying the weighting coefficient to each of the transmission signals received at a plurality of antennas to generate a plurality of weighted signals; and summing the plurality of weighted signals. As noted, the method may further include using the golden reference signal to calibrate the phase of the transmission signals received at a plurality of antennas.

A system is provided for receiving a transmission signal, comprising: a plurality of antennas, each antenna receiving a received signal; a ranking module ranking the plurality of antennas according to quality of the received signal of each of the plurality of antennas and generating a corresponding level one signal, and selecting highest ranking antenna as a golden reference signal; a synchronizer using the golden reference signal to synchronize the received signals of all of the plurality of antennas; a level two module calculating peak to average power ratio for each of the received signal of each of the plurality of antennas and generating a corresponding level two signal; a scoring unit generating a weighting score for each of the received signal of each of the plurality of antennas using the level one and level two signals; a weighting module applying the weighting score to each corresponding received signal of each of the plurality of antennas to generate a plurality of weighted signals; and, a summing module combining all of the weighted signals.

Figure 2A:
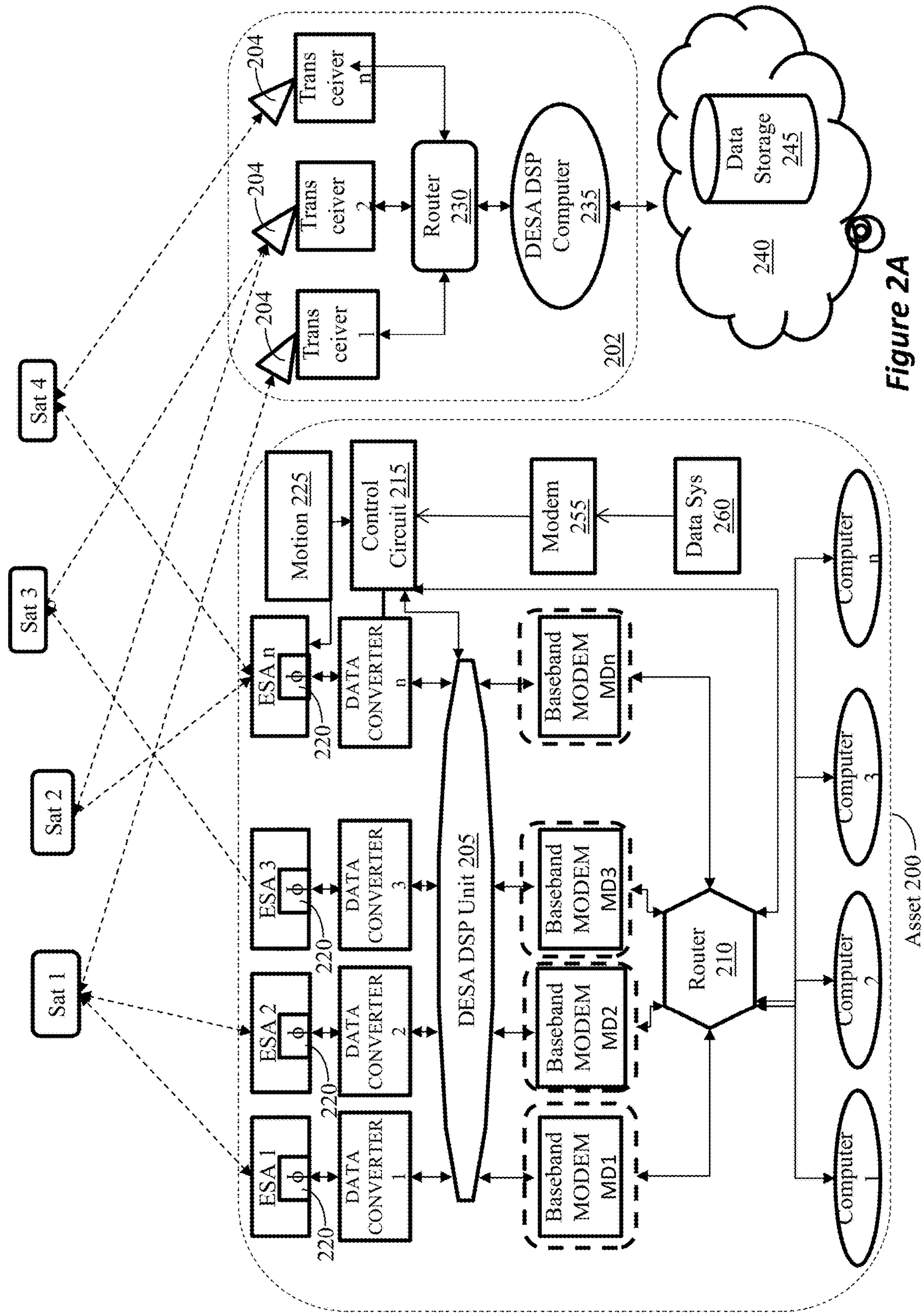

FIG. 2A illustrates an embodiment for satellite communication implementing receive diversity combing for improve overall SNR. The embodiment of FIG. 2A is similar to the embodiment illustrated in FIG. 2, and therefore will not be described in details. The embodiment in FIG. 2A illustrates how the DESA elements of FIGS. 7 and 8 can be incorporated into the architecture of FIG. 2, thus enabling receive diversity combing for improve overall SNR.

Figure 3B:
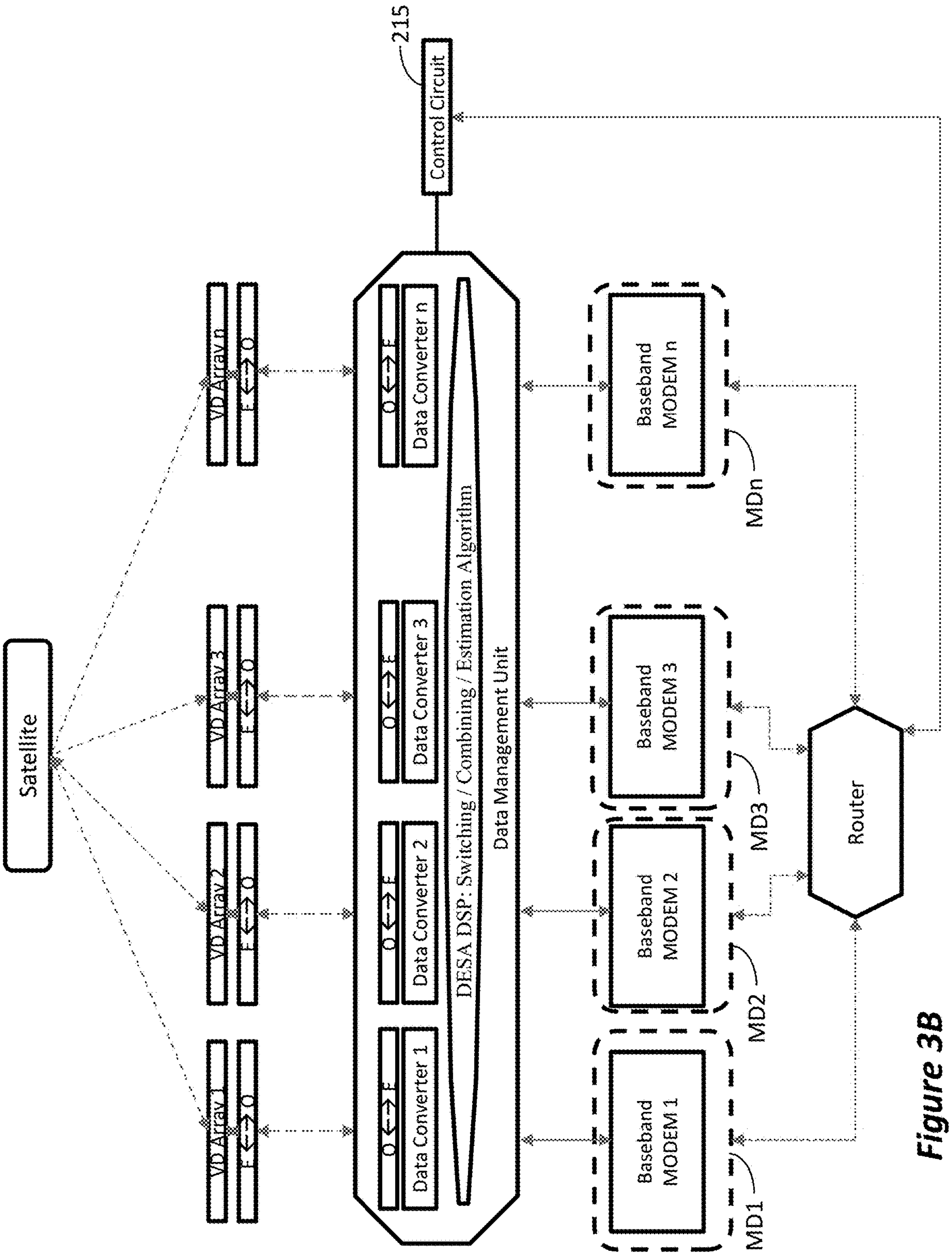

Similarly, FIG. 3B illustrates an embodiment for satellite communication implementing receive diversity combing to improve the overall SNR, which incorporates fiber optics. The embodiment of FIG. 3B is similar to the embodiment illustrated in FIG. 3, and therefore will not be described in details. The embodiment in FIG. 3B illustrates how the DESA elements of FIGS. 7 and 8 can be incorporated into the architecture of FIG. 3, thus enabling receive diversity combing for improve overall SNR.

FIG. 5A illustrates a flow chart for non-ordered steps of an embodiment that may be taken to perform diversity receive combine operation for improved overall SNR. In step 540 the signal is received at multiple antennas, which may include, e.g., cellular antennas, Wi-Fi antennas, array antennas, etc. While the data of the signal received at the antennas is the same, the quality of the signal received at each antenna may not be the same, thus causing different SNR or RSSI at each channel. The method proceeds to generate a weighted sum of the signals so as to improve the overall SNR, as follows. The method generates two ranking signals, a level one ranking signal and a level two ranking signal. The level one ranking signal is generated in step 545 by obtaining coefficients of cross correlations of the signals from the multiple channels. The ranking is ordered such that the highest coefficient is the best signal and the lowest coefficient is the worst channel. Also, at step 550 the best channel (highest coefficient) is selected as the golden reference signal. The level two ranking signal is generated in step 555, by calculating the PAPR for each of the channels. The ranking is ordered such that the lowest PAPR is the best signal and the highest PAPR is the worst channel.

At step 560 the golden reference signal is used to synchronize the channels in time domain. At step 565 the golden reference signal is used to calibrate the phase of all the channels. At step 570 the level one ranking and the level two ranking are used to generate weights and then the signal of each channel is weighted by the corresponding weight. At step 575 the weighted signals of the channels are added together.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. An antenna system for satellite communication, comprising:

a plurality of antennas, each antenna comprising a phased array of radiators;

a plurality of modems;

a switch configured for dynamically coupling any antenna to any of the modems;

a plurality of communication devices;

a router configured to dynamically couple any of the communication devices to any of the modems; and a controller controlling the switch and the router to provide instructions to configured connections of the plurality of antennas, the modems and the communication devices.

2. The antenna system of claim 1, wherein each of the plurality of antennas comprises at least one of:

a plurality of delay lines, each delay line coupled to one radiator of the phased array of radiators; and a plurality of active beam forming chips corresponding to the phased array of radiators.

3. The antenna system of claim 2, wherein each of the plurality of antennas comprises:

a plurality of delay lines, each delay line coupled to one radiator of the phased array of radiators and wherein each delay line traverses a variable dielectric constant material.

4. The antenna system of claim 3, wherein each of the antennas further comprises:

a phase controller controlling delay amount introduced by each of the delay lines.

5. The antenna system of claim 1, wherein each of the antennas further comprises:

a phase controller and wherein the phase controller comprises a database storing a listing of all available satellites and their location in the sky.

6. The antenna system of claim 5, further comprising:

motion circuitry providing motion data of the available satellites to least one of the controller and the phase controller.

7. The antenna system of claim 5, wherein the phase controller comprises:

a control port receiving a control signal from the controller indicating which satellite the antenna is to communicate with.

8. The antenna system of claim 5, wherein the controller comprises:

a data port that is in functional connection with the router, wherein the controller actively bases switching decisions based on data collected from the router.

9. The antenna system of claim 1, further comprising:

a plurality of electro-optical transceivers, each coupled to one of the antennas;

an optical fiber management unit; and a plurality of fiber optic lines coupling each of the electro-optical transceivers to the optical fiber management unit.

10. The antenna system of claim 1, wherein the instructions comprise:

real-time instructions.

11. A system mounted onto a mobile platform for communication with satellites, comprising:

a plurality of phased array antennas, each having a plurality of radiators and a plurality of phase shifters, each phase shifter introducing delay to an RF signal propagating therethrough;

at least one phase controller operating the phase shifters to introduce the delay to the RF signal;

a plurality of modems;

a switch operatively connecting any of the modems to any of the phased array antennas;

a communication device;

a router operatively routing signals between any of the modems and the communication device; and a control circuit providing instructions to the switch to form connections between the modems to any of the phased array antennas and to the router to route signals between the modems and any of the phased array antennas.

12. The system of claim 11, further comprising:

a motion indicator providing motion signal to the control circuit indicative of the motion of the mobile platform.

13. The system of claim 12, wherein the motion indicator comprises:

a global positioning system receiver.

14. The system of claim 11, wherein each of the phase shifters comprises one of: a delay line traversing a variable dielectric constant material, or an active beam forming chip.

15. The system of claim 11, wherein each of the phase shifters comprises one of:

a delay line traversing a variable dielectric constant material, and wherein each of the phase shifters comprises:

control lines receiving control signals from the phase controller.

16. The system of claim 11, further comprising:

a plurality of electro-optical transceivers, each coupled to one of the antennas;

an optical fiber management unit; and a plurality of fiber optic lines coupling each of the electro-optical transceivers to the optical fiber management unit.

17. The system of claim 11, wherein the switch comprises: a switch operatively connecting any of the modems to any of the phased array antennas as determined in real-time, and wherein the instructions are real-time instructions.

18. The system of claim 11, wherein the phase controller comprises:

a database configurable to store a listing of all available satellites and their location.

* * * * *